(12) United States Patent
Ikenoya et al.

(10) Patent No.: US 7,703,565 B2
(45) Date of Patent: Apr. 27, 2010

(54) DISPOSITION STRUCTURE OF DRIVE DEVICE FOR VEHICLE

(75) Inventors: Kazutoshi Ikenoya, Ibaragi (JP); Kenji Asada, Hiroshima (JP); Shigeyuki Mori, Hiroshima (JP)

(73) Assignee: Mazda Motor Corporation (JP)

( * ) Notice: Subject to any disclaimer, the term of this patent is extended or adjusted under 35 U.S.C. 154(b) by 20 days.

(21) Appl. No.: 12/014,139

(22) Filed: Jan. 15, 2008

(65) Prior Publication Data

US 2008/0179116 A1 Jul. 31, 2008

(30) Foreign Application Priority Data

Jan. 29, 2007 (JP) ............................. 2007-017262

(51) Int. Cl.
*B60K 1/00* (2006.01)
(52) U.S. Cl. ............... 180/65.51; 180/65.6; 280/124.15
(58) Field of Classification Search ............. 180/65.51, 180/65.6; 280/124.15, 124.153, 124.154, 280/124.155
See application file for complete search history.

(56) References Cited

U.S. PATENT DOCUMENTS

| | | | | |
|---|---|---|---|---|
| 5,087,229 A * | 2/1992 | Hewko et al. | ................ | 475/149 |
| 5,150,763 A * | 9/1992 | Yamashita et al. | ........... | 180/252 |
| 5,156,579 A * | 10/1992 | Wakuta et al. | ............... | 475/161 |
| 5,163,528 A * | 11/1992 | Kawamoto et al. | ....... | 180/65.51 |
| 5,180,180 A * | 1/1993 | Yamashita et al. | ........... | 180/253 |
| 5,322,141 A * | 6/1994 | Brunner et al. | ........... | 180/65.51 |
| 5,382,854 A * | 1/1995 | Kawamoto et al. | ........ | 310/67 R |
| 6,276,474 B1 * | 8/2001 | Ruppert et al. | ............. | 180/65.6 |
| 6,386,553 B2 * | 5/2002 | Zetterstrom | ................ | 280/5.51 |
| 6,540,632 B1 * | 4/2003 | Wendl et al. | .................... | 475/5 |
| 6,688,412 B2 * | 2/2004 | Kima et al. | .............. | 180/65.51 |
| 6,698,313 B2 * | 3/2004 | Gaffney et al. | ............ | 74/665 N |
| 7,118,119 B2 * | 10/2006 | Amanuma | ........... | 280/124.135 |
| 7,121,367 B2 * | 10/2006 | Ajiro et al. | ............... | 180/65.51 |

(Continued)

FOREIGN PATENT DOCUMENTS

EP 1364816 A2 11/2003

(Continued)

OTHER PUBLICATIONS

European Search Report for EP 08000856.8 dated Mar. 19, 2008.

(Continued)

*Primary Examiner*—Jeffrey J Restifo
(74) *Attorney, Agent, or Firm*—Studebaker & Brackett PC; Donald R. Studebaker

(57) ABSTRACT

There are provided plural suspension links, one end of each of which is coupled to a wheel and the other end of each of which is coupled to a vehicle body. The suspension links are disposed so as to extend substantially in a vehicle width direction. A drive motor is disposed so as to be offset from a center of a wheel on a side that is away from disposition location of the suspension links. The drive motor and the wheel are coupled by a drive-force transmitting mechanism so that a drive force can be transmitted. Accordingly, there can be provided the disposition structure of a drive device for a vehicle that can provide both the drive motors and the suspension links without any improper interference, ensuring proper controlling of the wheel positions.

9 Claims, 6 Drawing Sheets

U.S. PATENT DOCUMENTS

| | | | |
|---|---|---|---|
| 7,228,928 B2 * | 6/2007 | Mizutani et al. | 180/65.51 |
| 7,243,749 B2 * | 7/2007 | Kakinami et al. | 180/65.51 |
| 7,306,065 B2 * | 12/2007 | Nagaya | 180/65.51 |
| 7,347,295 B2 * | 3/2008 | Kurata | 180/65.51 |
| 7,350,605 B2 * | 4/2008 | Mizutani et al. | 180/65.51 |
| 7,350,606 B2 * | 4/2008 | Brill et al. | 180/65.51 |
| 7,398,846 B2 * | 7/2008 | Young et al. | 180/65.51 |
| 7,413,203 B2 * | 8/2008 | Kurata | 280/124.156 |
| 7,537,071 B2 * | 5/2009 | Kamiya | 180/65.51 |
| 2007/0209852 A1 | 9/2007 | Kamiya | |

FOREIGN PATENT DOCUMENTS

| | | |
|---|---|---|
| EP | 1364816 A3 | 1/2006 |
| FR | 2776966 A1 | 10/1999 |
| JP | 2004090822 | 3/2004 |
| JP | 2006130986 | 5/2006 |
| JP | 2006-248273 | 9/2006 |
| JP | 2006-248417 | 9/2006 |

OTHER PUBLICATIONS

Corresponding Euopean Patent Application No. 08000856.8 (Abstract and Official Action dated Apr. 17, 2008).

* cited by examiner

DISPOSITION STRUCTURE OF DRIVE DEVICE FOR VEHICLE

BACKGROUND OF THE INVENTION

The present invention relates to a disposition structure of a drive device for a vehicle, such as an electric automobile or a hybrid vehicle, which comprises a drive motor to drive a rear wheel that is disposed in a wheel.

Recently, a technology in which a drive motor to drive a vehicle wheel is disposed in a wheel (a so-called in-wheel motor) in order to simplify a drive-force transmitting system from a power resource to the vehicle wheel has been developed (see Japanese Patent Laid-Open Publication Nos. 2006-248273 and 2006-248417).

A right wheel and a left wheel of the vehicle can be controlled independently by the drive motor provided for each wheel. Accordingly, this vehicle has really effective advantages in its practical operation.

Meanwhile, in a case where the above-described drive motors are applied to rear wheels of the vehicle, there is a problem in that a relatively large-sized drive motors would interfere with suspension links that are provided so as to extend substantially in a vehicle width direction with an appropriate length for properly controlling positions of the rear wheels (such as a camber angle).

SUMMARY OF THE INVENTION

An object of the present invention is to provide a disposition structure of a drive device for a vehicle that can provide both the drive motors and the suspension links without any improper interference therebetween, ensuring proper controlling of the wheel position.

According to the present invention, there is provided a disposition structure of a drive device for a vehicle, comprising a drive motor operative to drive a rear wheel, the drive motor being disposed in a wheel, a plurality of suspension links, one end of each of which is coupled to the wheel and the other end of each of which is coupled to a vehicle body, the suspension links being disposed so as to extend substantially in a vehicle width direction, and a drive-force transmitting mechanism operative to couple the drive motor to the wheel so as to transmit a drive force, wherein the drive motor is disposed so as to be offset from a center of the wheel on a side that is away from a disposition location of the suspension links.

According to the above-described structure, since the drive motor is disposed so as to be offset from the center of the wheel on the side that is away from the disposition location of the suspension links, both the drive motor and the suspension links with the appropriate length can be properly provided without any improper interference therebetween, ensuring the proper controlling of the wheel position. Further, there can be provided a large-sized drive motor that ensures a sufficient output torque. Also, a layout flexibility of the plural suspension links and the drive motor is improved, so a vehicle compartment or a baggage compartment can be properly enlarged.

According to an embodiment of the present invention, the drive motor is disposed so as to be offset from the center of the wheel on a vehicle forward side, and the suspension links are disposed behind the drive motor. Thereby, the drive motor as a relatively heavy-weight object is disposed at a location that is closer to the center of the vehicle, so a yawing moment of inertia can be reduced. Also, the appropriate length of the suspension links can be ensured.

According to another embodiment of the present invention, the drive motor is disposed so as to overlap at least part of the suspension link in an elevation view. Thereby, the suspension link (see an upper link) can be disposed in a dead space that is produced by the drive motor's offset disposition, ensuring disposition of the large-sized drive motor, so the layout flexibility of the suspension links can be improved.

According to another embodiment of the present invention, the drive motor is disposed so as to overlap at least part of the suspension link in a plan view. Thereby, disposition of the large-sized drive motor and proper disposition of the suspension link (see a lower link) can be made compatible.

According to another embodiment of the present invention, the suspension links comprise an upper link that is disposed above the center of the wheel, and the upper link is disposed behind the drive motor. Thereby, disposition of the large-sized drive motor and disposition of the upper link with an appropriate length can be made compatible.

According to another embodiment of the present invention, the suspension links comprise a lower link that is disposed below the center of the wheel, and the lower link is disposed behind the drive motor. Thereby, disposition of the large-sized drive motor and disposition of the lower link with an appropriate length can be made compatible.

According to another embodiment of the present invention, the upper and lower links respectively comprise a pair of links, and the upper and lower links are respectively disposed such that a longitudinal distance between one ends thereof coupled to the wheel is smaller than that between the other ends thereof coupled to the vehicle body. Thereby, each disposition angle of the pair of links can be properly set, the appropriate length of the upper and lower links can be ensured, and the large-sized drive motor can be disposed.

According to another embodiment of the present invention, there is provided a toe-control link that extends substantially in the vehicle width direction, one end of which is coupled to the wheel and the other end of which is coupled to the vehicle body, and the one end of the toe-control link that is coupled to the wheel is disposed so as to be offset from the center of the wheel on a side that is away from a disposition location of the drive motor. Thereby, disposition of the large-sized drive motor and disposition of the toe-control link can be made compatible, the sufficient output torque can be ensured by the large-sized drive motor, and proper controlling of the wheel position, especially a toe angle of the wheel, can be achieved by the above-described disposition of the toe-control link. Also, a layout flexibility of the toe-control link and the drive motor is improved, so the vehicle compartment or the baggage compartment can be properly enlarged.

According to another embodiment of the present invention, the toe-control link is disposed below the drive motor. Thereby, both the drive motor and the toe-control link can be more properly disposed.

According to another embodiment of the present invention, in the wheel is provided a brake disc that rotates with the rear wheel and a brake caliper that controls the brake disc, and the brake caliper is disposed so as to be offset from the center of the wheel on a side that is away from a disposition location of the drive motor. Thereby, respective disposition of the large-sized drive motor, a large-sized brake caliper and the suspension links can be made compatible. Also, the sufficient output torque can be ensured by the large-sized drive motor, and a proper braking force can be ensured by the large-sized brake caliper.

According to another embodiment of the present invention, the brake caliper is disposed behind the drive motor. Thereby, the drive motor that has its heavier weight than the brake caliper is disposed at a location that is closer to the center of the vehicle, so the yawing moment of inertia can be properly reduced.

Other features, aspects, and advantages of the present invention will become apparent from the following description which refers to the accompanying drawings.

DETAILED DESCRIPTION OF THE INVENTION

Figure 1:
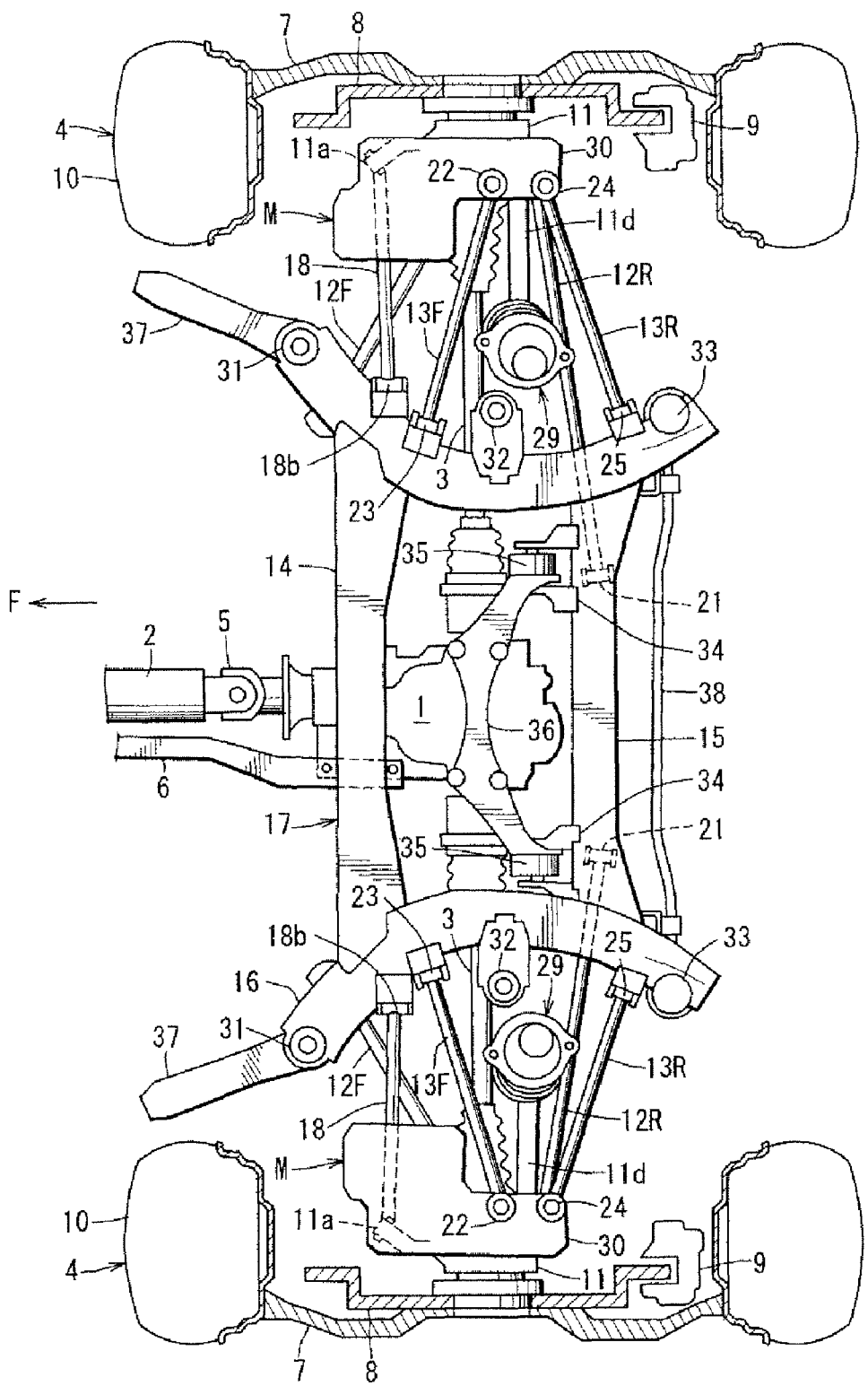
FIG. 1 is a plan view showing a disposition structure of a drive device for a vehicle according to the present invention.

Preferred embodiments of the present invention will be descried referring to the accompanying drawings. Figures show a disposition structure of a drive device for a vehicle. In FIG. 1, a hybrid vehicle of the present embodiment has a power unit equipped with an engine and a transmission at a front portion. At a vehicle rear portion is provided a rear deferential device 1 as a differential unit, as illustrated. A propeller shaft 2 interconnects an output shaft of the transmission and an input shaft of drive pinion or the like of the rear differential device 1.

An engine rotational force is transmitted to rear wheels 4, 4 via the transmission, propeller shaft 2, rear differential device 1, and axle shafts 3, 3. A reference character 5 denotes a universal joint in the figure.

There is provided a power plant frame 6 that extends in a longitudinal direction of the vehicle between a front power unit and the rear differential device 1 (specifically, between a mission housing and a differential case).

The power plant frame 6 allows its roll-direction movement from an engine drive system, but suppresses a windup movement of the rear differential device 1. This frame 6 is configured to have a strong rigidity in a bending direction and a flexibility in a torsional direction.

The rear wheel 4 provided at the vehicle rear portion comprises, as shown in FIG. 1, a wheel 7 having a rim portion and a disc portion, a brake disc 8 that is disposed in the wheel 7 and rotates with the rear wheel 4, a brake caliper 9 that is fixed to a vehicle-side side and controls the brake disc 8, and a tire 10.

Further, a drive motor M (hereinafter, referred to as "motor," simply) that is operative to drive the rear wheel 4 is disposed in the wheel 7.

Figure 2:
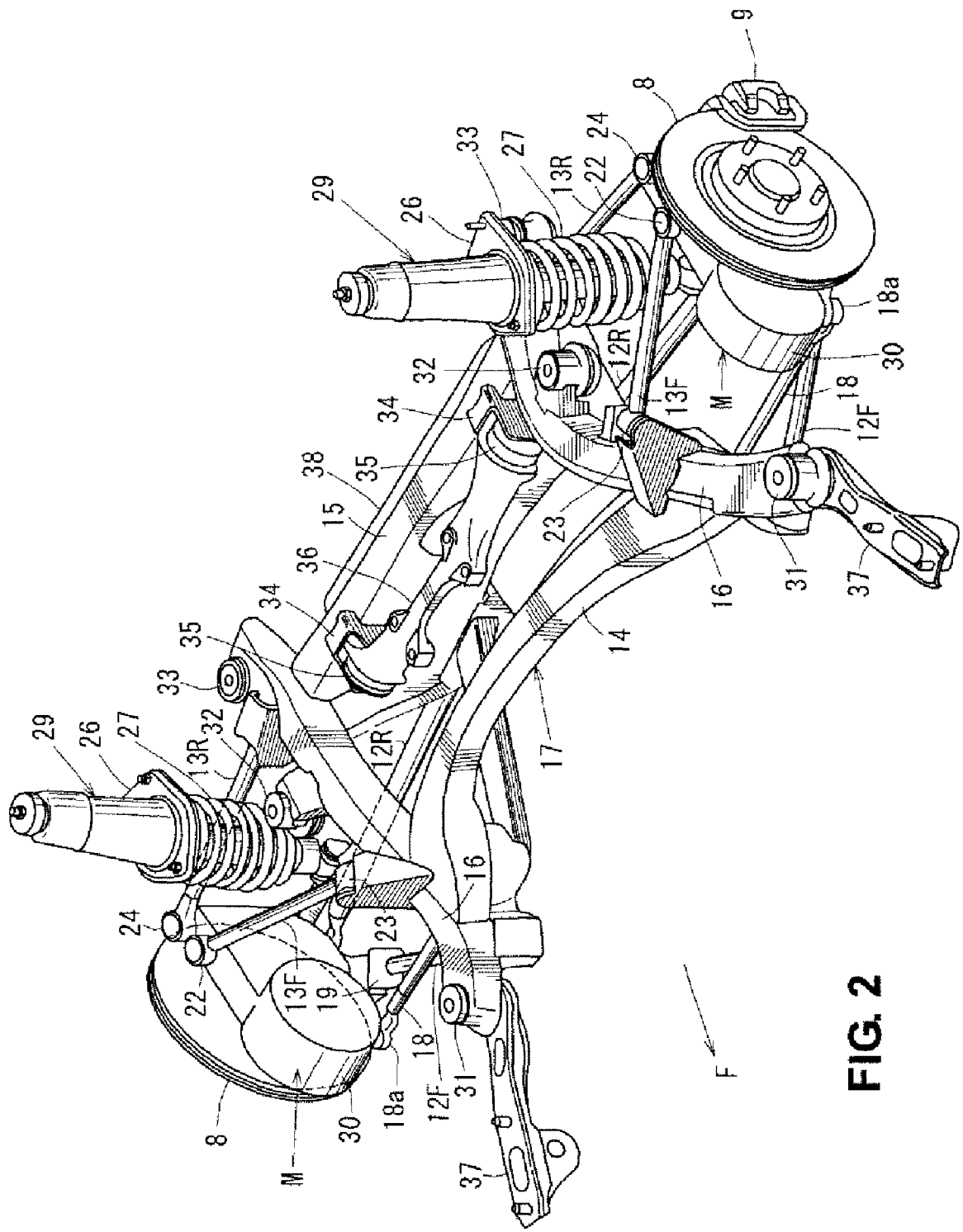
FIG. 2 is a perspective view of the structure of FIG. 1, when viewed from a vehicle front.
Figure 3:
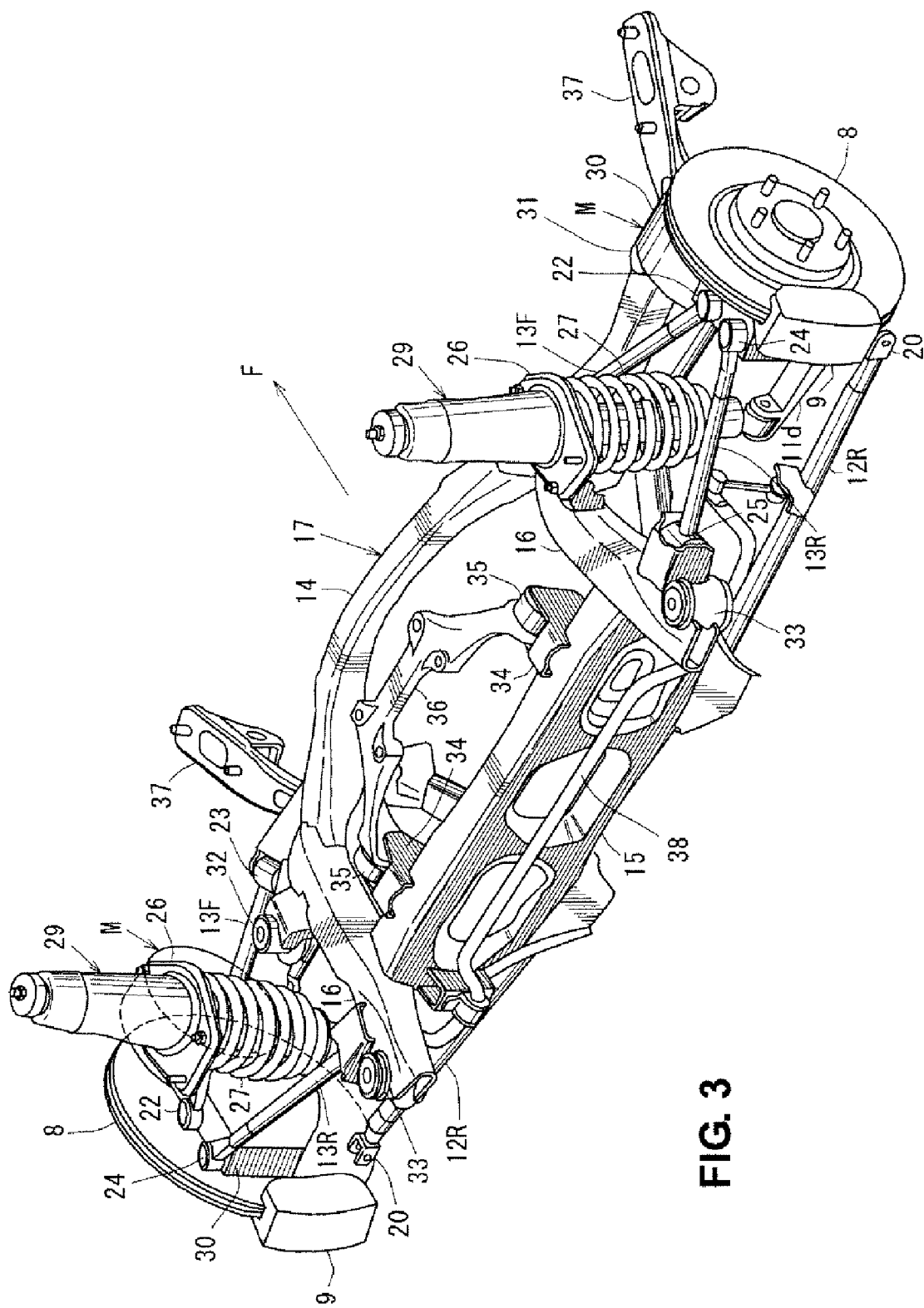
FIG. 3 is a perspective view of the structure of FIG. 1, when viewed from a vehicle rear.

A multi-link type of rear suspension for the rear wheels 4, 4 is configured to be shown in FIGS. 1-3.

Namely, the rear suspension comprises suspension links that are comprised of a pair of lower links 12F, 12R and a pair of upper links 13F, 13R that have a shorter arm length than the lower links 12F, 12R, and a sub frame 17 (suspension cross member) that is comprised of a front cross member 14, a rear cross member 15, and right-and-left side cross members 16, 16, which are assembled together in a frame shape.

There is further provided a toe-control link 18 that extends substantially in the vehicle width direction, one end 18*a* (a wheel-side connection portion shown in FIG. 2) of which is coupled to a front extension portion ha of a wheel hub 11 (a wheel support member) and the other end 18*b* (a vehicle-body-side connection portion) of which is coupled to the side cross member 16 of the sub frame 17 as a vehicle body.

Figure 4:
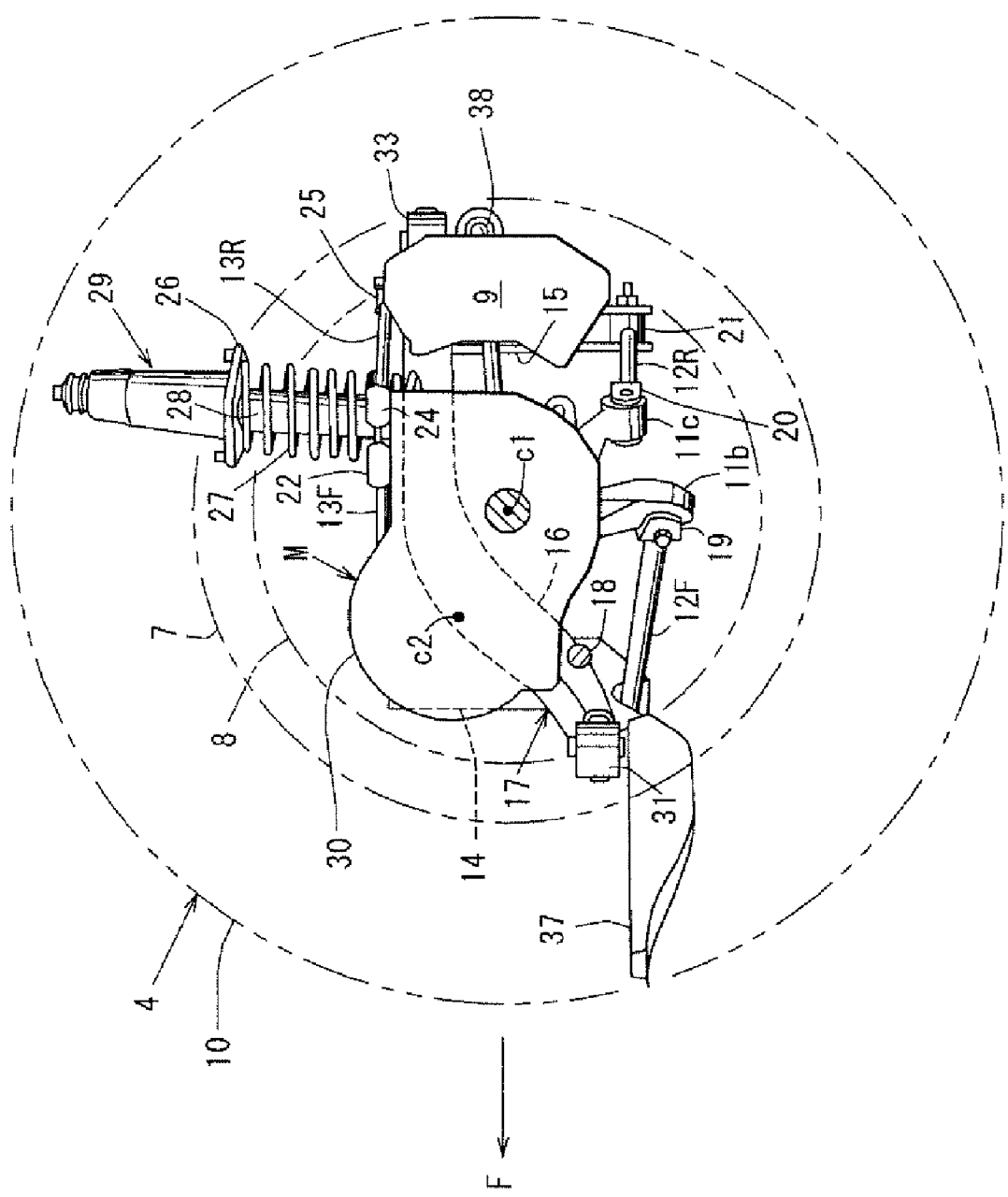
FIG. 4 is a side view showing the disposition structure of a drive device for a vehicle.

As shown in FIG. 4 where the center of the wheel 7 is denoted by a wheel center c1 and the center of the motor M is denoted by a motor center c2, the motor M is disposed so as to be offset from the wheel center c1 on a side that is away from a disposition location of the toe-control link 18 (i.e., on an upper side).

Namely, the motor M is disposed so as to be offset upward from the wheel center c1. And, the toe-control link 18 and its wheel-side connection portion are disposed below the motor M. Further, the toe-control link 18 is disposed so as to be offset forward from the center (motor center c2) of the motor M.

The motor M is disposed so as to overlap part of the toe-control link in a plan view, as shown in the plan view of FIG. 1.

The above-described plural suspension links (lower links 12F, 12R, upper links 13F, 13R) are disposed so as to extend in the vehicle width direction and to support the wheel 7 so that the wheel 7 can move at least in a vertical direction.

As shown in FIGS. 1 and 4, a wheel-side connection portion 19 (see FIG. 4) of the front lower link 12F is coupled to a lower extension portion 11*b* of the wheel hub 11, and a vehicle-body-side connection portion of the front lower link 12F is pivotally coupled to the side cross member 16 via a lower-link bush (not illustrated).

Likewise, a wheel-side connection portion 20 (see FIG. 4) of the rear lower link 12R is coupled to a rear lower extension portion 11*c* of the wheel hub 11, and a vehicle-body-side connection portion of the rear lower link 12R is pivotally coupled to the rear cross member 15 via a lower-link bush 21.

These lower links 12F, 12R are disposed below the wheel center c1 and a motor housing 30, which will be described below. The wheel-side connection portions 19, 20 of the lower links 12F, 12R are disposed so as to be offset rearward from the center of the motor M.

As shown in FIGS. 1 and 4, a wheel-side connection portion 22 of the front upper link 13F is coupled to the motor housing 30 of the motor M, and a vehicle-body-side connection portion of the front upper link 13F is pivotally coupled to the side cross member 16 via an upper-link bush 23.

Likewise, a wheel-side connection portion 24 of the rear upper link 13R is coupled to the motor housing 30, and a vehicle-body-side connection portion of the rear upper link 13R is pivotally coupled to the side cross member 16 via an upper-link bush 25.

These upper links 13F, 13R are disposed above the wheel center c1. The wheel-side connection portions 22, 24 of the upper links 13F, 13R are disposed at an upper face portion of the motor housing 30 that is located so as to be offset rearward from the center of the motor M.

In disposition relationships between the motor M and the plural suspension links (lower links 12F, 12R, upper links 13F, 13R), the motor M is disposed so as to be offset from the wheel center c1 on a side that is away from the disposition location of the wheel-side connection portions 19, 20, 22, 24 of the suspension links (i.e., on the forward side).

Namely, the motor M is disposed so as to be offset forward from the wheel center c1, and the wheel-side connection portions 19, 20, 22, 24 of the suspension links (lower links 12F, 12R, upper links 13F, 13R) are disposed behind the motor M.

Also, as shown in the side view of FIG. 4, the motor M (specifically, the motor housing 30) is disposed so as to overlap at least part of the upper links 13F, 13R of the plural suspension links in the elevation view. Further, as shown in FIG. 1, the motor M is disposed so as to overlap at least part of the lower links 12F, 12R of the plural suspension links in the plan view.

Further, the pair of upper inks 12F, 12R are disposed such that a longitudinal distance between their wheel-side connection portions is smaller than that between the vehicle-body-side connection portions as shown in the plan view of FIG. 1. Likewise, the pair of lower inks 13F, 13R are disposed such that a longitudinal distance between their wheel-side connection portions is smaller than that between the vehicle-body-side connection portions as shown in the plan view of FIG. 1.

Meanwhile, between the inner extension portion 11d of the wheel hub 11 and the vehicle body, such as a suspension tower and the like, is provided a damper 29 that comprises an upper sheet 26, a lower sheet, a coil spring 27, and a strut 28, as shown in FIGS. 1 and 4. The damper 29 is located between the upper links 13F, 13R in the plan view as shown in FIG. 1. Further, at the right and left side cross members 16, 16 are respectively provided three resilient mounts 31, 32, 33 for supporting the sub frame 17 to the vehicle body, which are disposed in the longitudinal direction, as shown in FIG. 1.

Herein, these resilient mounts 31, 32, 33 are disposed, as shown in FIG. 1, in such a manner that the middle mount 32 is located inside of an imaginary line that interconnects the front mount 31 and the rear mount 33, when viewed in the plan view. Thus, the distance in the vehicle width direction between the right and left middle resilient mounts 32 can be made short.

The middle and rear resilient mounts 32, 33 are disposed longitudinally so as to be substantially in parallel to an imaginary longitudinal center line of the vehicle body.

The above-described rear cross member 15, rear lower link 12R and damper 29 are disposed between the middle resilient mount 32 and the rear resilient mount 33. Brackets 34, 34 for supporting the rear differential device 1 are provided at a front vertical wall of the rear cross member 15.

Thereby, the rear differential device 1 is supported at the above-described brackets 34, 34 via differential mounts 35, 35 and a bracket 36 that is attached to the rear differential device 1.

Further, a pair of reinforcement link members 37, 37 is provided at lower portions of the right and left front resilient mounts 31 so as to extend forward and outward respectively. A reference character 38 denotes a stabilizer in FIGS. 1-4.

Figure 5:
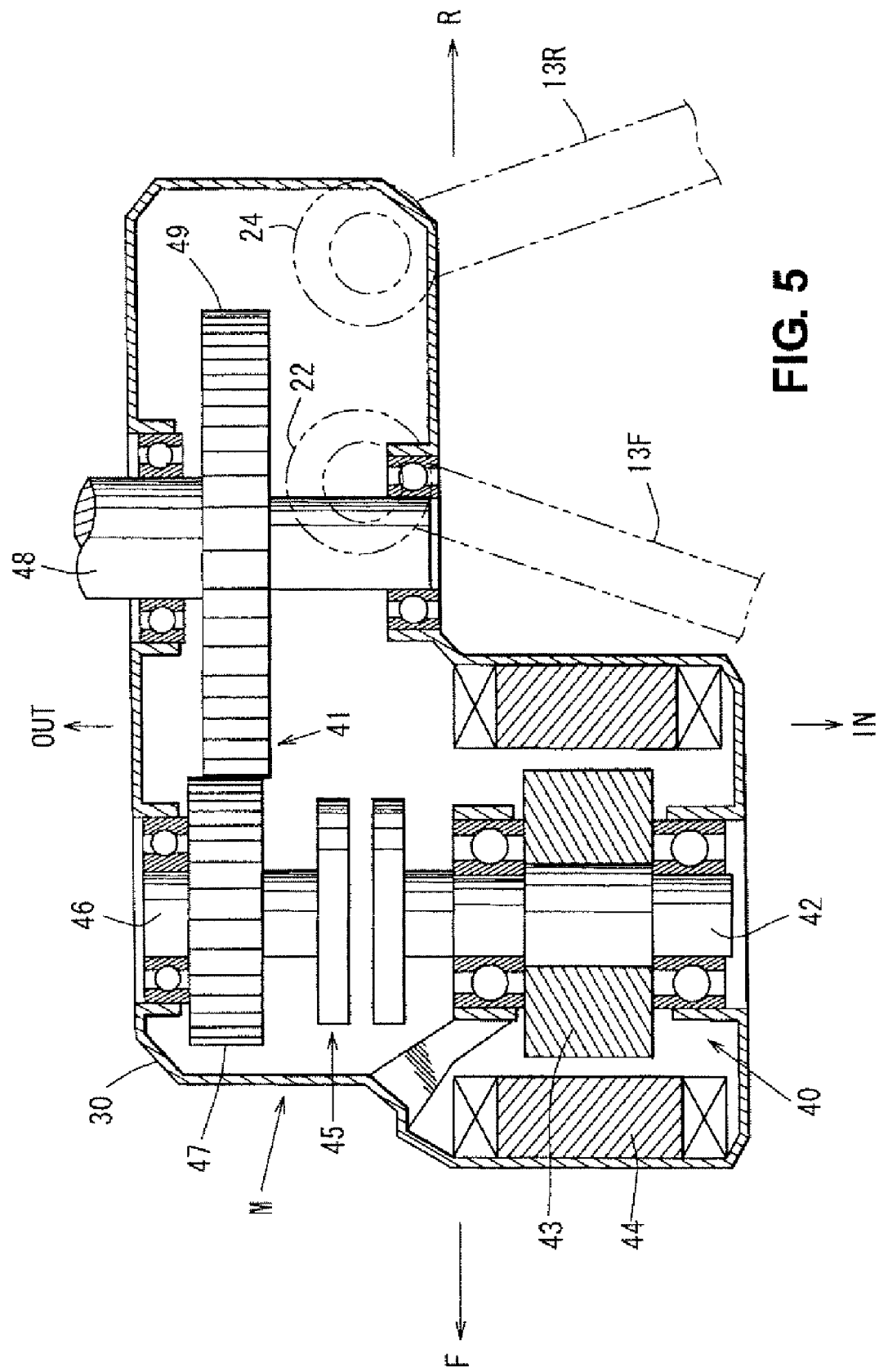
FIG. 5 is a sectional view showing an internal structure of a motor housing.

FIG. 5 shows an internal structure of the motor M, which comprises a motor portion 40 and a drive-force transmission mechanism 41. The motor portion 40 is comprised of a motor rotational shaft 42, a rotator 43, and a stator 44. An idle shaft 46 is provided at the motor rotational shaft 42 via a clutch 45. A drive gear 47 is fixed to the idle shaft 46, and a driven gear 49 for driving the wheel 7 is fixed to a wheel axle 48. Herein, the driven gear 49 engages with the drive gear 47 all the time. These elements 46, 47, 49 constitute the drive-force transmission mechanism 41. When the clutch 45 is ON (connected), the motor output is transmitted to the wheel 7.

Thus, the motor M and the wheel 7 are interconnected via the drive-force transmission mechanism 41 so as to transmit the drive force, and the above-described elements 40-49 are enclosed by the motor housing 30. In the figures, an arrow F indicates a vehicle forward direction, an arrow R indicates a vehicle rearward direction, an arrow IN indicates a vehicle inward direction, and an arrow OUT indicates a vehicle outward direction.

According to the present embodiment shown in FIGS. 1-5, there is provided the disposition structure of a drive device for a vehicle, comprising the motor M operative to drive the rear wheel 4, the motor M being disposed in the wheel 7, the plural suspension links (see the lower links 12F, 12R, upper links 13F, 13R), one end of each of which is coupled to the wheel 7 and the other end of each of which is coupled to the vehicle body, the suspension links being disposed so as to extend substantially in the vehicle width direction, and the drive-force transmitting mechanism 41 operative to couple the motor M to the wheel 7 so as to transmit the drive force, wherein the motor M is disposed so as to be offset from the center (wheel center c1) of the wheel 7 on the side that is away from the disposition location of the suspension links (lower links 12F, 12R, upper links 13F, 13R) (i.e., on the forward side) (see FIGS. 1 and 5).

According to the above-described structure, since the motor M is disposed so as to be offset from the center (wheel center c1) of the wheel 7 on the side that is away from the disposition location (specifically, the disposition location of the wheel-side connection portions of the links) of the suspension links (see the lower links 12F, 12R, upper links 13F, 13R), both the large-sized motor M and the suspension links with the appropriate length can be properly provided without any improper interference therebetween, ensuring the proper controlling of the wheel position. Further, there can be provided the large-sized motor M that ensures a sufficient output torque. Also, a layout flexibility of the plural suspension links and the motor M is improved, so a vehicle compartment or a baggage compartment can be properly enlarged.

Further, the motor M is disposed so as to be offset from the center (wheel center c1) of the wheel 7 on the vehicle forward side, and the suspension links are disposed behind the motor M (see FIGS. 1 and 4). Thereby, the motor M as a relatively heavy-weight object is disposed at a location that is closer to the center of the vehicle, so a yawing moment of inertia can be reduced. Also, the appropriate length of the suspension links can be ensured.

Also, the motor M is disposed so as to overlap at least part of the suspension link (see the upper links 13F, 13R) in the elevation view (see FIG. 4). Thereby, the suspension link (see the upper links 13F, 13R) can be disposed in a dead space that is produced by the motor's offset disposition, ensuring disposition of the large-sized motor M, so the layout flexibility of the suspension links can be improved.

Additionally, the motor M is disposed so as to overlap at least part (vehicle-outside part) of the suspension link (see the lower links 12F, 12R) in the plan view (see FIG. 1). Thereby, disposition of the large-sized motor M and proper disposition of the suspension link (see the lower links 12F, 12R) can be made compatible.

Further, the suspension links comprise the upper links 13F, 13R that are disposed above the center (see the wheel center c1) of the wheel 7, and the upper links 13F, 13R (specifically, the wheel-side connection portions) are disposed behind the motor M (see FIGS. 1 and 4). Thereby, disposition of the large-sized motor M and disposition of the upper links 13F, 13R with the appropriate length can be made compatible.

Also, the suspension links comprise the lower links 12F, 12R that are disposed below the center (see the wheel center c1) of the wheel 7, and the lower links 12F, 12R (specifically, the wheel-side connection portions) are disposed behind the motor M (see FIGS. 1 and 4). Thereby, disposition of the large-sized motor M and disposition of the lower links 12F, 12R with the appropriate length can be made compatible.

Further, the upper and lower links respectively comprise a pair of links 13F, 13R, 12F, 12R, and the upper and lower links 131F, 13R, 121', 12R are respectively disposed such that the longitudinal distance between one ends thereof coupled to the wheel 7 is smaller than that between the other ends thereof coupled to the vehicle body (see FIG. 1). Thereby, each disposition angle of the pair of links 13F, 13R, 12F, 12R can be properly set, the appropriate length of the upper and lower links 13F, 13R, 12F, 12R can be ensured, and the large-sized motor M can be disposed.

Also, there is provided the toe-control link 18 that extends substantially in the vehicle width direction, one end (outside end) of which is coupled to the wheel 7 via the wheel hub 11 and the other end (inside end) of which is coupled to the vehicle body (see the sub frame 17), and the one end of the toe-control link 18 that is coupled to the wheel 7 is disposed so as to be offset from the center (wheel center c1) of the wheel 7 on the side that is away from the disposition location of the motor M (i.e., on the lower side) (see FIGS. 1, 4 and 5). Thereby, disposition of the large-sized motor M and disposition of the toe-control link 18 can be made compatible, the sufficient output torque can be ensured by the large-sized motor M, and proper controlling of the wheel position, especially the toe angle of the wheel 7, can be achieved by the above-described disposition of the toe-control link 18. Also, a layout flexibility of the toe-control link 18 and the motor M is improved, so the vehicle compartment or the baggage compartment can be properly enlarged.

And, the toe-control link 18 is disposed below the motor M. Thereby, both the motor M and the toe-control link 18 can be more properly disposed.

Further, in the wheel 7 is provided the brake disc 8 that rotates with the rear wheel 4 and a brake caliper 9 that controls the brake disc 8, and the brake caliper 9 is disposed so as to be offset from the center (see the wheel center c1) of the wheel 7 on the side that is away from the disposition location of the motor M (see FIGS. 1 and 4). Thereby, respective disposition of the large-sized motor M, the large-sized brake caliper 9 and the suspension links can be made compatible. Also, the sufficient output torque can be ensured by the large-sized motor M, and a proper braking force can be ensured by the large-sized brake caliper 9.

Also, the brake caliper 9 is disposed behind the motor M. Thereby, the motor M that has its heavier weight than the brake caliper 9 is disposed at a location that is closer to the center of the vehicle, so the yawing moment of inertia can be properly reduced.

Figure 6:
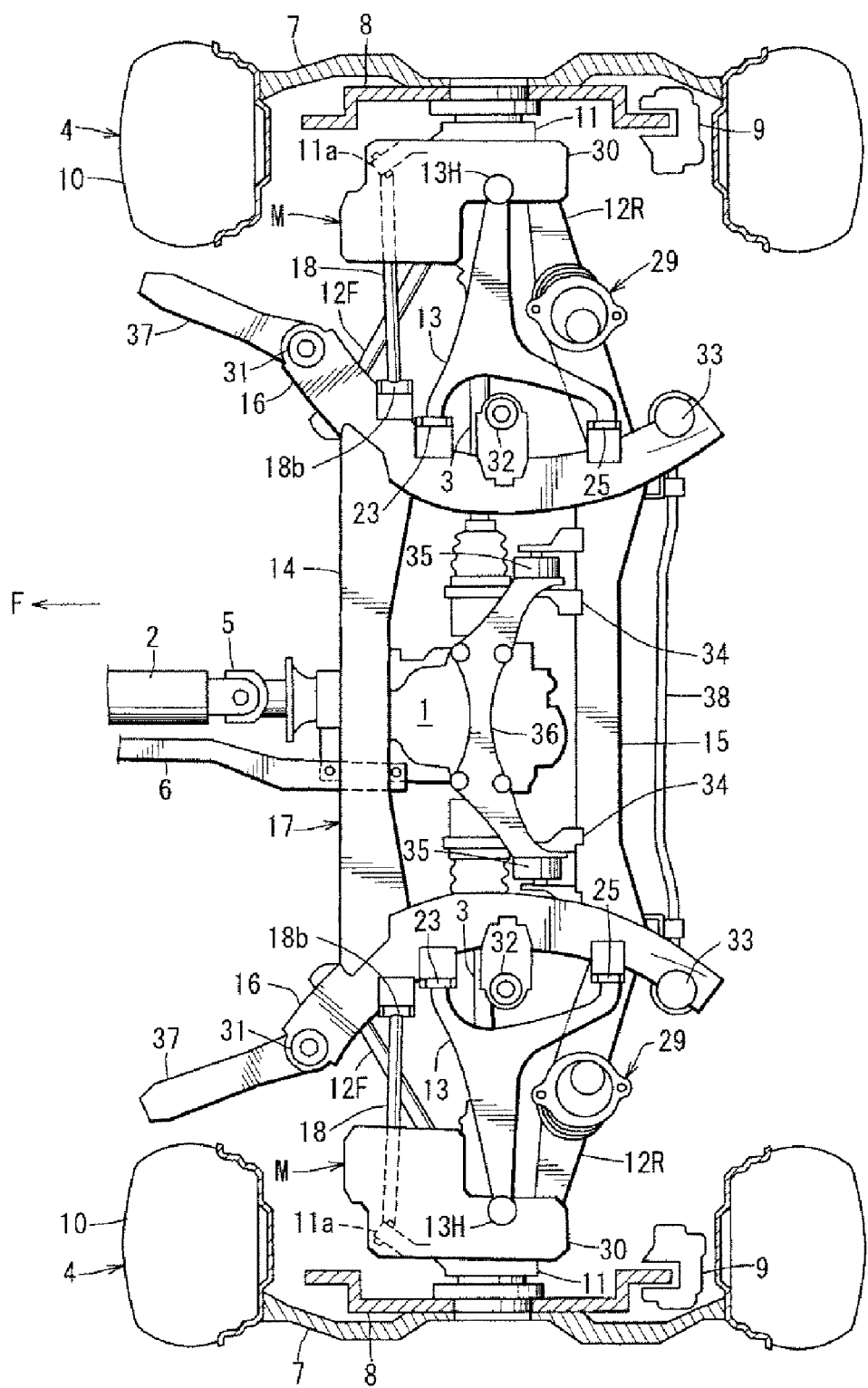
FIG. 6 is a plan view showing a disposition structure of a drive device for a vehicle according to another embodiment.

FIG. 6 shows another embodiment of the disposition structure of a drive device for a vehicle. In this embodiment, an A-shaped upper link 13 is applied in place of the pair of upper links 13F, 13R shown in FIG. 1. A wheel-side connection portion 13H of this upper link 13 is attached to the motor housing 30 behind the motor center c2 (see FIG. 4). The rear lower link 12R, which is provided so as to extend in the vehicle width direction between the wheel hub 11 and the sub frame 17, is configured to have a wider width than the lower link 12R shown in FIG. 1 so that the damper 29 can be placed on a middle portion of the lower link 12R. Thereby, any interference between the A-shaped upper link 13 and the damper 29 is avoided.

Other constitution, functions and effects of the present embodiment shown in FIG. 6 is substantially the same as those of the previous embodiment shown in FIGS. 1-5. Therefore, the same portions are denoted by the same reference characters, whose detailed descriptions are omitted.

While the suspension links of the present invention correspond to the lower links 12F, 12R and the upper links 13F, 13R, 13 of the above-described embodiments, the present intention should not be limited to the above-described embodiments. For example, while the wheel-side connection portions 19, 20 of the lower links 12F, 12R are coupled to the extension portions 11b, 11c that are integrally formed with the wheel hub 11 of the embodiments, the extension portions 11b, 11c may be integrally formed with the motor housing 30.

What is claimed is:

1. A disposition structure of a drive device for a vehicle, comprising:
   a rear wheel having a disc portion and a rim portion;
   a drive motor operative to drive the rear wheel, the drive motor being disposed in the rear wheel so as to be positioned within a space enclosed by the disc portion and the rim portion of the rear wheel;
   a plurality of suspension links, one end of each of which is coupled to the rear wheel via a wheel-side connection portion and the other end of each of which is coupled to a vehicle body via a vehicle-body-side connection portion, the suspension links being disposed so as to extend substantially in a vehicle width direction, the suspension links comprising at least an upper link which is positioned above a center of the rear wheel and a lower link which is positioned below the center of the rear wheel;
   a damper, one end of which is coupled to a side of the rear wheel and the other end of which is coupled to a side of the vehicle body;
   a drive-force transmitting mechanism operative to couple the drive motor to the rear wheel so as to transmit a drive force; and
   a motor housing enclosing said drive motor and said drive-force transmitting mechanism,
   wherein said drive motor is disposed so as to be offset from the center of the rear wheel in a specified vehicle-longitudinal direction, said wheel-side connection portion of the upper link is disposed at a specified portion of said motor housing which is offset from a center of the drive motor in an opposite direction to said specified vehicle-longitudinal direction.

2. The disposition structure of a drive device for a vehicle of claim 1, wherein said drive motor is disposed so as to be offset forward from the center of the rear wheel said wheel-side connection portion of the upper link is disposed at a specified portion of the motor housing which is offset rearward from the center of the drive motor, and said damper is disposed behind the center of the drive motor.

3. The disposition structure of a drive device for a vehicle of claim 1, wherein said drive motor is disposed so as to overlap at least part of said upper link in an elevation view.

4. The disposition structure of a drive device for a vehicle of claim 1, wherein said drive motor is disposed so as to overlap at least part of said upper link in a plan view.

5. The disposition structure of a drive device for a vehicle of claim 1, wherein said upper and lower links respectively comprise a pair of links, and the upper and lower links are respectively disposed such that a longitudinal distance between one ends thereof coupled to the wheel is smaller than that between the other ends thereof coupled to the vehicle body.

6. The disposition structure of a drive device for a vehicle of claim 1, wherein there is provided a toe-control link that extends substantially in the vehicle width direction, one end of which is coupled to the rear wheel and the other end of which is coupled to the vehicle body, and the one end of the toe-control link that is coupled to the rear wheel is disposed so as to be offset from the center of the rear wheel on a side that is away from a disposition location of said drive motor.

7. The disposition structure of a drive device for a vehicle of claim 6, wherein said toe-control link is disposed below said drive motor.

8. The disposition structure of a drive device for a vehicle of claim 1, wherein a brake disc that rotates with the rear wheel and a brake caliper that controls the brake disc are provided in the rear wheel so as to be positioned within the space enclosed by the disc portion and the rim portion of the rear wheel, and the brake caliper is disposed so as to be offset from the center of the wheel on a side that is away from a disposition location of said drive motor.

9. The disposition structure of a drive device for a vehicle of claim 8, wherein said brake caliper is disposed behind said drive motor.

\* \* \* \* \*